United States Patent
Abdulkhair et al.

(10) Patent No.: US 12,365,586 B1
(45) Date of Patent: Jul. 22, 2025

(54) NANOCOMPOSITE OF GRAPHITIC $C_3N_4$, $MnO_2$, AND $MgAl_2O_4$ FOR HYDROGEN GENERATION

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Nady Abd El-Hameed Ibrahim, Riyadh (SA); Mohamed Khairy Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/070,243

(22) Filed: Mar. 4, 2025

(51) Int. Cl.
| | |
|---|---|
| C01B 3/06 | (2006.01) |
| B01J 23/00 | (2006.01) |
| B01J 23/02 | (2006.01) |
| B01J 27/24 | (2006.01) |
| B01J 35/61 | (2024.01) |
| B01J 35/63 | (2024.01) |
| B01J 35/64 | (2024.01) |
| B01J 35/67 | (2024.01) |
| B01J 37/08 | (2006.01) |

(52) U.S. Cl.
CPC ............ *C01B 3/065* (2013.01); *B01J 23/005* (2013.01); *B01J 23/02* (2013.01); *B01J 27/24* (2013.01); *B01J 35/613* (2024.01); *B01J 35/633* (2024.01); *B01J 35/647* (2024.01); *B01J 35/67* (2024.01); *B01J 37/08* (2013.01)

(58) Field of Classification Search
CPC ......... C01B 3/065; B01J 23/005; B01J 23/16; B01J 27/24
See application file for complete search history.

(56) References Cited

U.S. PATENT DOCUMENTS

| | | |
|---|---|---|
| 2012/0121499 A1 | 5/2012 | Kang et al. |
| 2013/0168228 A1* | 7/2013 | Ozin ............... B01J 37/0215 |
| | | 977/773 |

FOREIGN PATENT DOCUMENTS

| | | |
|---|---|---|
| CN | 105817255 B | 4/2019 |
| CN | 110404574 A | 11/2019 |

(Continued)

OTHER PUBLICATIONS

Fahad Abdulaziz, et al., "Structure-performance relationship of SrTiO3/S@g-C3N4 nanocomposites for highly active hydrogen production via NaBH4 methanolysis". Diamond and Related Materials, vol. 148, Oct. 2024, 7 Pages.

*Primary Examiner* — Anthony J Zimmer
*Assistant Examiner* — Eric Scott Sherman
(74) *Attorney, Agent, or Firm* — Oblon, McClelland, Maier & Neustadt, L.L.P.

(57) ABSTRACT

A method of hydrogen generation may include contacting sodium borohydride ($NaBH_4$) and a nanocomposite comprising graphitic $C_3N_4$, $MnO_2$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2000 to 5000 mL/(min·g).

20 Claims, 5 Drawing Sheets

(56) References Cited

FOREIGN PATENT DOCUMENTS

| CN | 117772261 B | 4/2024 |
| CN | 118437373 A | 8/2024 |

\* cited by examiner ional processes, heating, and energy storage, providing versatility in energy solutions. Hydrogen can store excess renewable energy for long periods, helping to balance sup-

NANOCOMPOSITE OF GRAPHITIC $C_3N_4$, $MnO_2$, AND $MgAl_2O_4$ FOR HYDROGEN GENERATION

BACKGROUND

Technical Field

The present disclosure is directed to nanocomposites, more particularly, to nanocomposites of g-$C_3N_4$@$MnO_2$/$MgAl_2O_4$ as catalysts for the generation of $H_2$ via the hydrolysis of $NaBH_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, tremendous industrialization and population increases have led to a search for alternate energy sources to meet the expanding energy demand. Primarily, the depletion of non-renewable energy resources and environmental concerns compel societies to switch to clean, renewable energy sources soon. Although generating energy from the sun is cheap, the storage of this energy costs money because people have to rely on battery storage, which can be replaced repeatedly, is expensive, and is difficult to dispose of safely. On the other hand, hydrogen energy is cleaner and has several advantages over battery systems: it's 100% clean, has extended life storage, and unlimited production and storage. Hydrogen energy has several advantages over batteries when saving energy and powering various applications. Here are some key benefits, including the fact that $H_2$ has a higher energy density than most batteries, meaning it can store more energy in a smaller volume, making it ideal for applications like transportation, where weight and space are critical. Refueling a hydrogen vehicle can take just a few minutes, similar to traditional gasoline vehicles, whereas charging batteries can take much longer. $H_2$ fuel cells can provide longer ranges than battery electric vehicles, making them suitable for heavy-duty applications and long-distance travel. Further, they are lighter than the equivalent battery systems for large-scale applications, such as trucks or ships, which is crucial for efficiency and payload capacity. $H_2$ production can be scaled up from renewable sources (like electrolysis using solar or wind power), potentially leading to sustainable and large-scale energy storage solutions. Unlike batteries, which degrade over time and require replacement, hydrogen systems can maintain performance over a longer lifespan with proper maintenance. Also, $H_2$ can be used in various sectors beyond transportation, such as industrial processes, heating, and energy storage, providing versatility in energy solutions. Hydrogen can store excess renewable energy for long periods, helping to balance supply and demand in the energy grid. Further, hydrogen can offer a clean energy alternative when produced from renewable sources, emitting only water vapor when used in fuel cells, and can help stabilize the electrical grid by acting as a flexible energy storage solution, absorbing excess energy during peak production times.

While hydrogen energy has significant advantages, it is essential to consider the challenges, such as production costs, infrastructure, and energy conversion efficiency; however, its potential for a sustainable energy future is promising. Research has been conducted in this regard, e.g., in *Sust. Energy Techn. Assess.* 2023, 55, 102905 and *Resources, Conserv. Recycl.* 2020, 155, 104662, each of which is incorporated by reference herein, but these have not satisfied all of the demands. Thus, a need remains in the market for further developments.

Accordingly, one object of the present disclosure is to provide an efficient method for hydrogen generation using a nanocomposite catalyst that may circumvent the drawbacks and limitations, such as high cost, high lead times, low efficiency, and poor environmental performance of methods and materials known in the art.

SUMMARY

In an exemplary embodiment, a method of hydrogen generation may include contacting sodium borohydride ($NaBH_4$) and water in the presence of a catalyst comprising a nanocomposite comprising graphitic $C_3N_4$, $MnO_2$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2000 to 5000 mL/(min·g).

The average pore distribution of the nanocomposite may be unimodal. The BET specific surface area of the nanocomposite may be in a range of from 16.2 to 20.2 m$^2$/g (18.7±3.33, 2.5, 2, 1.5, 1, 0.75, 0.67, 0.5, 0.33, 0.25, 0.125, 0.1, 0.05, or 0.01 m$^2$/g). The average pore diameter of the nanocomposite, according to BJH measurement method, may be in a range of from 5 to 15 nm (8.34±1.5, 1, 0.75, 0.67, 0.5, 0.33, 0.25, 0.125, 0.1, 0.05, or 0.01 nm). The average pore volume of the nanocomposite, according to the BJH measurement method, may be in a range of from 0.025 to 0.075 cm$^3$/g (0.05±0.02, 0.01, 0.0075, 0.005, 0.0025, or 0.001 cm$^3$/g).

The nanocomposite may have a (220) spinel interplanar spacing in a range of from 0.258 to 0.338 nm (0.298±0.1, 0.075, 0.05, 0.025, 0.01, 0.0075, 0.005, 0.0025, or 0.001 nm), (400) spinel interplanar spacing in a range of from 0.165 to 0.245 nm (0.205 nm), (002) $MnO_2$ interplanar spacing in a range of from 0.106 to 0.186 nm (0.146±0.075, 0.05, 0.025, 0.01, 0.0075, 0.005, 0.0025, or 0.001 nm), and (211) $Al_2O_3$ interplanar spacing in a range of from 0.093 to 0.173 nm (0.133±0.05, 0.025, 0.01, 0.0075, 0.005, 0.0025, or 0.001 nm), according to selected area diffraction.

The mass relationship of the nanocomposite may be in a range of from 9 to 11:4 to 6:84 to 86, wherein the nanocomposite may have a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to selected area diffraction, wherein an XRD spectrum of the nanocomposite under Cu-filtered CuKα radiation (1.5418 Å) powered at 45 kV and 10 mA may have 20 peaks of an $MnO_2$ pyrolusite phase at 28.4±1, 40.5±1, 44.9±1, 56.0±1, 66.4±1, and/or 79.1±1°, an $MgAl_2O_4$ spinel phase at 19.1±1, 31.3±1, 44.8±1, 56.1±1, 59.5±1, 74.09±1, and/or 78.1±1°, an MgO cubic phase at 42.8±1, 62.2±1, and/or 74.6±1°, an $Al_2O_3$ phase at 31.3±1, 34.3±1, and/or 61.6±1°, and/or g-$C_3N_4$-related diffractions at 18.8±1, 28.2±1, 35.5±1, 40.7±1, 44.6±1, and/or 73.7±1°. It is possible that no more than 5, 4, 3.33, 2.5, 2, 1.5, 1, 0.75, 0.67, 0.5, 0.33, 0.25, 0.125, 0.1, 0.05, or 0.01% relative intensity of any other phase may be detected in the XRD spectrum, even none.

The high hydrogen generation rate in contacting sodium borohydride ($NaBH_4$) and the water in the presence of the nanocomposite may be in a range of from 2100 to 3500 mL/(min·g), e.g., 2471±500, 333, 250, 200, 150, 100, 75, 67, 60, 50, 40, 33, 25, 20, or 15 mL/(min·g). The hydrogen generation rate in contacting sodium borohydride ($NaBH_4$) and the nanocomposite may be in a range of from 2 to 10-fold that without the nanocomposite.

The nanocomposite may have no more than 0.1 parts, individually or in any combination, of thiol, amine, carboxylate, and hydroxyl functionalizations per 100 $MnO_2$ units, relative to a total metal oxide weight.

The nanocomposite may include no more than 1 wt. %, individually or in any combination, of $TiO_2$, $Ti_2AlN$, $Fe_3O_4$, AlN, ZnO, and $SiO_2$, relative to a total metal oxide weight.

The nanocomposite may include no more than 1 atoms of Ce, relative to 100 atoms of Mn.

The carbon materials in the nanocomposite may include no more than 1 wt. %, individually or in combination, carbon nanotubes or carbon dots, relative to total nanocomposite weight.

The nanocomposite may include no more than 1 wt. % AgBr, relative to a total metal oxide weight, and wherein the nanocomposite no more than 1 wt. % tungsten oxide, relative to a total nanocomposite weight.

The nanocomposite may include no more than 1 wt. %, individually or in any combination, of a sulfide, phosphide, and boride, relative to total nanocomposite weight.

The nanocomposite may include no more than 1 wt. %, individually or in any combination, CuO, aluminosilicate, and $WO_3$, relative to total nanocomposite weight.

The nanocomposite may include no more than 1 wt. %, individually or in combination, elemental state Co and Fe, relative to total nanocomposite weight.

The nanocomposite may include no more than 0.1 wt. % of any noble metal individually or in any combination, relative to total nanocomposite weight.

The nanocomposite may include no more than 10 wt. % MgO, relative to a total metal oxide weight. The nanocomposite may include no clay.

The nanocomposite obtained may include no more than 1 wt. % carbonaceous material besides the graphitic carbon nitride. The graphitic $C_3N_4$ may be not nitrogen deficient. The carbon materials in the nanocomposite may include no more than 0.01 wt. % nanotubes and no nanorods, relative to total nanocomposite weight.

The nanocomposite may include no more than 10 wt. % $Mn_3O_4$, relative to total manganese oxide weight, or wherein the nanocomposite comprises manganese oxide in only one oxidation state.

Relative to a total metal oxide weight, the nanocomposite may include no more than 1 wt. %, individually or in any combination, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$(Co, Ni, Zn)$_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and $LaFeO_3$.

The graphitic $C_3N_4$ in the nanocomposite may consists essentially of sheet morphologies. The graphitic $C_3N_4$ in the nanocomposite may include no more than inevitable traces of boron.

The nanocomposite may include no more than 10 wt. %, individually or in any combination, relative to total metal content, of any of Zn, Ce, Gd, La, Ba, Ti, Ca, Sr, Zr, Pb, Ni, Ag, Au, Pt, Pd, Co, Cu, Mn, Cd, W, Ta, Nb, Pr, and Bi. The nanocomposite may include no more than 1 wt. %, individually or in any combination, relative to total carrier weight, of $SiO_2$, $TiO_2$, ZnO, NiB, and ZnS.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
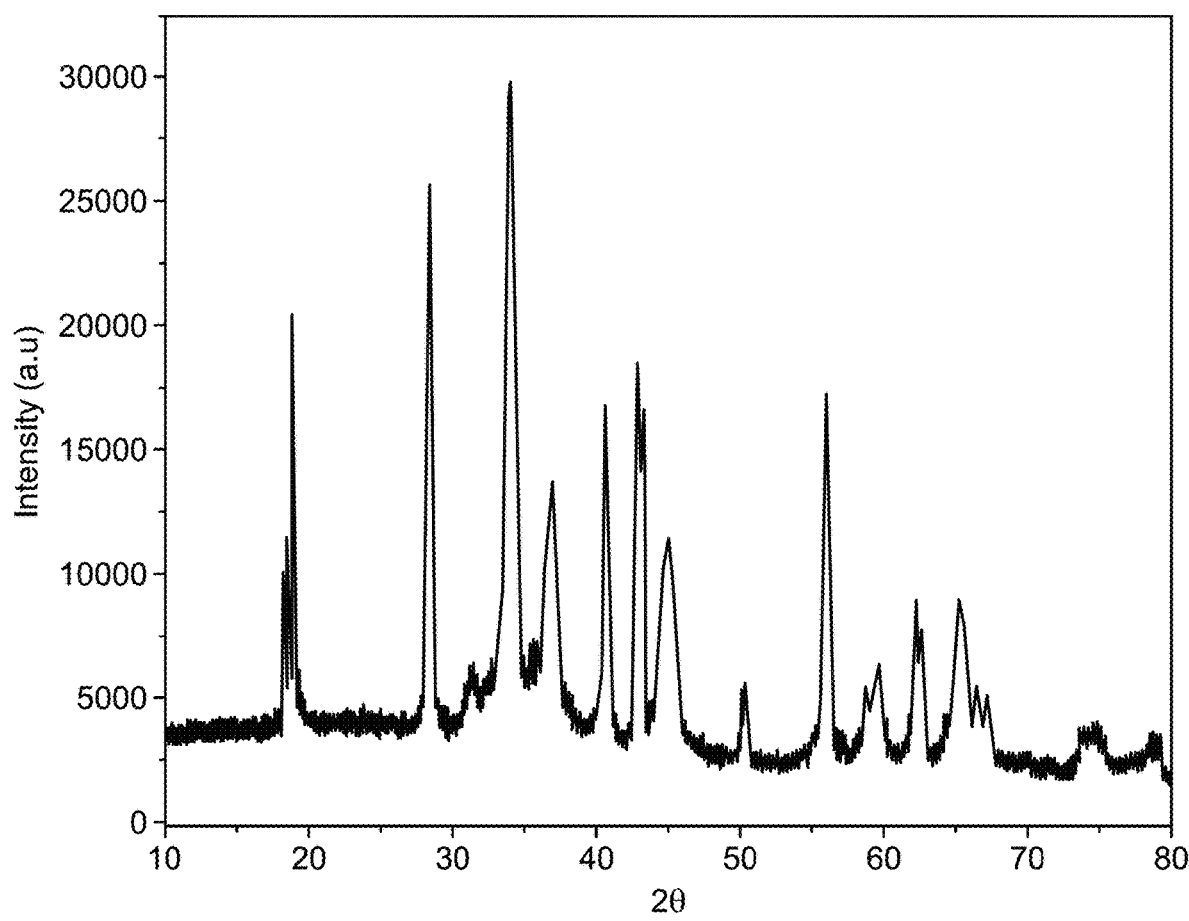
FIG. 1 illustrates X-ray diffraction (XRD) pattern of an inventive $MnO_2/MgAl_2O_4/g$-$C_3N_4$ nanocomposite.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a g-$C_3N_4$@$MnO_2$/$MgAl_2O_4$ (10:5:85, wt. %) nanocomposite designed to function as a catalyst to enhance the hydrolysis of sodium borohydride ($NaBH_4$) for efficient production of hydrogen gas. The catalyst facilitates the safe and rapid release of hydrogen from $NaBH_4$, making it an efficient solution for clean hydrogen production. The present disclosure circumvents the drawbacks of prior art by addressing key limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The simplicity of its preparation and its high catalytic activity also ensure scalability and practical applicability, without needing to apply potential or use electrodes, making it a more efficient and sustainable alternative to existing methods.

The nanocomposite may include graphitic $C_3N_4$, $MnO_2$, and $MgAl_2O_4$. The mass relationship of graphitic $C_3N_4$, $MnO_2$, and $MgAl_2O_4$ in the nanocomposite may be in a range of from 5 to 15:2 to 7:75 to 95, preferably 6 to 10:3 to 6:80 to 90, preferably 9 to 11:4 to 6:84 to 86, and more preferably 10:5:85, while tolerable variations of any of these values may be ±2.5, 2, 1.5, 1, 0.75, 0.5, 0.25, 0.1, 0.5, or 0.1. When each component of the nanocomposite are used in desired weight ratios, the nanocomposite may exhibit excellent performance in energy production.

The nanocomposite may contain g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may contain 10±2.5, 2, 1.5, 1, 0.75, 0.5, 0.25, 0.1, 0.5, or 0.1 wt. % of graphite-phase carbon nitride (g-$C_3N_4$).

The nanocomposite may contain $MnO_2$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may contain 5±1.5, 1, 0.75, 0.5, 0.25, 0.1, 0.5, or 0.1 wt. % of $MnO_2$.

The nanocomposite may include magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may include 85±5, 4, 3.33, 2.5, 2, 1.5, 1, 0.75, 0.67, 0.5, 0.33, 0.25, 0.125, 0.1, 0.05, or 0.01 wt. % of magnesium aluminum oxide ($MgAl_2O_4$).

The graphitic $C_3N_4$ in the nanocomposite may consist essentially of sheet morphologies, e.g., such that no more than 5% of the hydrogen generation rate is lost relative to pure sheet morphology, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and mixtures thereof are also possible.

The graphitic $C_3N_4$ in the nanocomposite may include no more than inevitable traces of boron. Limiting boron to trace amounts ensures that the graphitic carbon nitride maintains its optimal performance in applications like photocatalysis, where the material's structural integrity and electron mobility are critical for efficiency.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 nm, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, a Brunauer-Emmett-Teller (BET) surface area of the nanocomposite may be in a range of from 16.2 to 20.2 square meters per gram ($m^2/g$), preferably 16.5 to 20 $m^2/g$, and preferably 18 $m^2/g$. The surface area on the nanocomposite may be 18.7±3.33, 2.5, 2, 1.5, 1, 0.75, 0.67, 0.5, 0.33, 0.25, 0.125, 0.1, 0.05, or 0.01 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

In some embodiments, an average pore diameter of the nanocomposite, according to Barrett-Joyner-Halenda (BJH) measurement method, may be in a range of from 5 to 15 nm, preferably 6 to 14 nm, preferably 7 to 13 nm, preferably 8 to 12 nm, and preferably 9 to 11 nm. The nanocomposite may have an average pore diameter of 8.34±2, 1.5, 1, 0.75, 0.67, 0.5, 0.33, 0.25, 0.125, 0.1, 0.05, or 0.01 nm.

In some embodiments, an average pore volume of the nanocomposite, according to the BJH measurement method, may be in a range of from 0.025 to 0.075 $cm^3/g$, preferably 0.04 to 0.06 $cm^3/g$, preferably 0.05 to 0.065 $cm^3/g$, and preferably 0.055 to 0.07 $cm^3/g$. The average pore volume of the nanocomposite may be 0.05±0.01, 0.0075, 0.005, 0.0025, 0.001, 0.0001, or 0.00001 $cm^3/g$.

The mass relationship of the nanocomposite may be in a range of from 9 to 11:4 to 6:84 to 86, and preferably 9.5 to 10.5:4.5 to 5.5:84.5 to 85.5. The mass relationship of the nanocomposite may be 10:5:85.

The nanocomposite may have a (220) spinel interplanar spacing in a range of from 0.258 to 0.338 nm, preferably 0.260 to 0.275 nm, preferably 0.275 to 0.300 nm, and preferably 0.275 to 0.330 nm, according to selected area electron diffraction (SAED). The nanocomposite may have a (400) spinel interplanar spacing in a range of from 0.165 to 0.245 nm, preferably 0.165 to 0.230 nm, preferably 0.170 to 0.210 nm, and preferably 0.180 to 0.240 nm, according to SAED. The nanocomposite may have a (002) $MnO_2$ interplanar spacing in a range of from 0.106 to 0.186 nm, preferably 0.130 to 0.185 nm, preferably 0.150 to 0.175 nm, and preferably 0.170 to 0.180 nm, according to SAED. The nanocomposite may have a (211) $Al_2O_3$ interplanar spacing in a range of from 0.093 to 0.173 nm, preferably 0.097 to 0.157 nm, preferably 0.107 to 0.147 nm, and preferably 0.117 to 0.167 nm; according to SAED.

The nanocomposite may have a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to SAED.

In some embodiments, an XRD spectrum of the nanocomposite under Cu-filtered CuKα radiation (1.5418 Å) powered at 45 kilovolt (kV) and 10 milliampere (mA) may have 20 peaks of a $MnO_2$ pyrolusite phase at 28.4±1, 40.5±1, 44.9±1, 56.0±1, 66.4±1, and/or 79.1±1°, a $MgAl_2O_4$ spinel phase at 19.1±1, 31.3±1, 44.8±1, 56.1±1, 59.5±1, 74.09±1, and/or 78.1±1°, a MgO cubic phase at 42.8±1, 62.2±1, and/or 74.6±1°, a $Al_2O_3$ phase at 31.3±1, 34.3±1, and/or 61.6±1°, and g-$C_3N_4$-related diffractions at 18.8±1, 28.2±1, 35.5±1, 40.7±1, 44.6±1, and/or 73.7±1°. The nanocomposite XRD may have no more than 5, 4, 3.33, 2.5, 2, 1.5, 1, 0.75, 0.67, 0.5, 0.33, 0.25, 0.125, 0.1, 0.05, or 0.01% relative intensity of any other phase may be detected in the XRD spectrum (or none, i.e., undetectable).

The $MgAl_2O_4$ spinel may be represented by diffractions at 20 values of 44.8, 56.1, 59.5, 74.09, 78.1, 19.1, and/or 31.3°. At 20 values of 42.8, 62.2, and/or 74.6°, the cubic phase of MgO may be detected. At 20 values of 28.4, 40.5, 44.9, 56.0, 66.4, and/or 79.10, pyrolusite phase of $MnO_2$ may be detected. At 20 values of 18.8, 28.2, 35.5, 40.7, 44.6, and/or 73.7° g-$C_3N_4$-related diffractions may be detected.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ is a mineral type of this oxide family. $MgAl_2O_4$ can be used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter ($g/cm^3$)), high thermal shock resistance, hydrophobicity, and low surface acidity.

The nanocomposite obtained may include no more than 0.1, 0.075, 0.05, 0.025, 0.01, 0.001, 0.0001, or 0.00001 parts, individually, of thiol, amine, carboxylate, and hydroxyl functionalization per 100 $MnO_2$ units, relative to a total metal oxide weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually of $TiO_2$, $Ti_2AlN$, $Fe_3O_4$, AlN, ZnO, or $SiO_2$, relative to a total metal oxide weight.

The nanocomposite may include no more than 1, 0.75, 0.5, 0.25, 0.1, 0.01, 0.001, 0.0001, or 0.00001 wt. % of carbon nanotubes (relative to all carbonaceous materials, e.g., none or no added/detectable nanotubes, preferably less than 0.9 wt. %, preferably less than 0.8 wt. %, preferably 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % or inevitable traces carbon nanotubes, relative to total nanocomposite weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % inevitable traces carbon dots, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % AgBr, relative to the total metal oxide weight.

The nanocomposite no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % tungsten oxide, relative to a total nanocomposite weight.

The nanocomposite no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in any combination, of a sulfide, phosphide, and/or boride, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in any combination, of CuO, aluminosilicate, and/or $WO_3$, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % Co, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % Fe, relative to total nanocomposite weight.

The nanocomposite no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % elemental state metal, relative to total nanocomposite weight. In a preferred embodiment, elemental metal may be Co and Fe.

The nanocomposite obtained may include no more than 0.1, 0.075, 0.05, 0.025, 0.01, 0.005, 0.001, 0.0001, or 0.00001 wt. % of any noble metal, preferably no more than 0.09 wt. %, preferably no more than 0.08 wt. %, preferably no more than 0.07 wt. %, preferably no more than 0.06 wt. %, preferably no more than 0.05 wt. %, preferably no more than 0.04 wt. %, preferably no more than 0.03 wt. %, preferably no more than 0.02 wt. %, preferably no more than 0.01 wt. %, preferably no more than 0.005 wt. %, and preferably no more than 0.001 wt. %, relative to total nanocomposite weight.

The nanocomposite obtained may include no more than 10, 7.5, 5, 4, 3, 2, 1, 0.5, 0.1, 0.01, 0.001, 0.0001, or 0.00001 wt. % MgO, preferably no more than 9 wt. % MgO, preferably no more than 8 wt. % MgO, preferably no more than 7 wt. % MgO, preferably no more than 6 wt. % MgO, preferably no more than 5 wt. % MgO, preferably no more than 4 wt. % MgO, preferably no more than 3 wt. % MgO preferably no more than 2 wt. % MgO, and preferably no more than 1 wt. % MgO, relative to a total metal oxide weight. The nanocomposite may include no clay, e.g., no more than 5, 4, 3, 2.5, 2, 1, 0.5, 0.1, 0.01, 0.001, 0.0001, or 0.00001 wt. %, relative to total nanocomposite weight, of clay.

The nanocomposite may include no more than 1, 0.75, 0.5, 0.25, 0.1, 0.01, 0.001, 0.0001, or 0.00001 wt. % of carbonaceous materials besides graphitic $C_3N_4$, preferably less than 0.9 wt. %, preferably less than 0.8 wt. %, preferably less than 0.7 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % of carbonaceous materials besides graphitic $C_3N_4$. A low concentration of carbonaceous material contributes to maintaining the desired structural integrity and functional properties of the nanocomposite. The minimal amount of additional carbon material prevents any significant interference with the performance of the graphitic carbon nitride, particularly in applications such as photocatalysis or energy storage, where the purity and specific properties of the g-$C_3N_4$ are crucial.

In some embodiment, carbon materials in the nanocomposite may include no nanotubes, relative to total nanocomposite weight, or none added. For example, carbon materials in the nanocomposite may include no more than 5, 4, 3, 2.5, 2, 1, 0.5, 0.1, 0.01, 0.001, 0.0001, or 0.00001 wt. %, relative to total nanocomposite carbonaceous material weight, of nanotubes. The graphitic $C_3N_4$ may be not nitrogen deficient. In one embodiment, carbon materials in the nanocomposite may include no more than 0.01 wt. % nanotubes and no nanorods, relative to total nanocomposite weight.

The nanocomposite obtained may include no more than 1, 0.75, 0.5, 0.25, 0.1, 0.01, 0.001, 0.0001, or 0.00001 atom of Ce, preferably no more than 0.9 atoms of Ce, preferably no more than 0.8 atoms of Ce, preferably no more than 0.7 atoms of Ce, preferably no more than 0.6 atoms of Ce, preferably no more than 0.5 atoms of Ce, preferably no more than 0.4 atoms of Ce, preferably no more than 0.3 atoms of Ce, preferably no more than 0.2 atoms of Ce, preferably no more than 0.1 atoms of Ce, preferably no more than 0.05 atoms of Ce, and preferably no more than 0.01 atoms of Ce, relative to 100 atoms of Mn (or relative to 10 or 1 atom of Mn).

The nanocomposite obtained may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.5 wt. %, and preferably no more than 0.1 wt. % $Mn_3O_4$, relative to total manganese oxide weight. The nanocomposite may include manganese oxide in only one oxidation state.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in any combination, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$ (Co, Ni, $Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and $LaFeO_3$, relative to a total metal oxide weight.

The nanocomposite may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.5 wt. %, and preferably no more than 0.1 wt. % elemental metal content, relative to total metal content. The metal may exclude or include Zn, Ce, Gd, La, Ba, Ti, Ca, Sr, Zr, Pb, Ni, Ag, Pt, Co, Cu, Mn, Cd, Ta, Nb, Pr, and/or Bi. Excessive metal accumulation could negatively impact the nanocomposite's stability, reactivity, or selectivity. By limiting the metal content, the nanocomposite maintains a high level of performance in its intended applications, ensuring that the active sites of the carrier material remain unblocked or inhibited, thus enhancing its long-term durability, minimizing unwanted side reactions, and preserving its efficiency in processes like catalysis or energy conversion.

The nanocomposite may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in any combination, of $SiO_2$, $TiO_2$, ZnO, and/or ZnS.

A method of hydrogen generation using the nanocomposite may include contacting sodium borohydride ($NaBH_4$) and a nanocomposite, including graphitic $C_3N_4$, $MnO_2$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2000 to 5000±1000, 500, 333, 250, 100, 50, 25, 15, 10, 5, 4, 3.33, 2.5, 2, 1.5, or 1 L/(min·g).

The method of contacting (e.g., sodium) borohydride with the nanocomposite may be performed at a temperature range of 20 to 70° C., preferably 25 to 65° C., preferably 30 to 60° C., preferably 35 to 55° C., preferably 40 to 50° C., preferably 40 to 45° C., more preferably at about 40° C. for a period of 1 to 60 minutes, preferably 5 to 10 minutes.

Other borohydride salts may be used additionally or in alternative, such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and/or combinations thereof.

The hydrogen may be generated at a hydrogen generation rate ranging from 2100 to 3500 mL/min per gram, with specific sub-ranges of 2200 to 3000 mL/min per gram, 2300 to 2900 mL/min per gram, 2400 to 2800 mL/min per gram, 2450 to 2700 mL/min per gram, 2450 to 2600 20 mL/min per gram of the nanocomposite. In a preferred embodiment, hydrogen may be generated at a hydrogen generation rate of 2471±750, 667, 500, 400, 333, 250, 200, 150, 100, 50, 25, 15, 10, 5, 4, 3.33, 2.5, 2, 1.5, or 1 mL/min per gram of the nanocomposite.

The contacting the borohydride with water in the presence of the nanocomposite may generate 2 to 10-fold more hydrogen in comparison to contacting the sodium borohydride with water in the absence of the nanocomposite after 5 minutes.

The following examples are provided solely for illustration and are not to be construed as limitations of the present disclosure, as many variations thereof are possible without departing from the spirit and scope of the present disclosure.

EXAMPLES

The following examples demonstrate a nanocomposite of graphitic-$C_3N_4$, $MnO_2$, and $MgAl_2O_4$ (g-$C_3N_4$@$MnO_2$/$MgAl_2O_4$). The examples are provided solely for illustration and are not to be construed as limitations of the present disclosure, as many variations thereof are possible without departing from the spirit and scope of the present disclosure.

Example 1: Fabricating the g-$C_3N_4$@$MnO_2$/$MgAl_2O_4$ (10:5:85, Wt %) Nanocomposite Magnesium nitrate and aluminum nitrate were added together in one beaker with manganese chloride amounts proper (here, stoichiometric) to produce a 10% $MnO_2$@$MgAl_2O_4$. About 10 g of dextrose as fuel was added to the beaker, followed by 30 mL of distilled water. The beaker was heated till a clear solution was obtained, then heated further till dryness. The product was ground in a mortar, transferred to a 150 mL porcelain dish, and calcined at 700° C. for 3.0 hours. Then after, the 10% $MnO_2$@$MgAl_2O_4$ product was cooled down to room temperature and weighed, then ground with urea amount suitable (here, 2 g urea to 20 g of the 10% $MnO_2$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $MnO_2$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$MnO_2$/$MgAl_2O_4$ (10:5:85, wt. %) nanohybrid. The quadruple mixture was returned and heated to 600° C. for 40.0 min in a covered porcelain crucible and cooled to room temperature; then after, the g-$C_3N_4$@$MnO_2$/$MgAl_2O_4$ (10:5:85, wt. %) nanocomposite was collected.

Results

FIG. 1 shows the findings of an XRD analysis of the crystallinity and phase identification found in the $MnO_2$/$MgAl_2O_4$/g-$C_3N_4$ catalyst. The powder may be highly crystalline, as indicated by the strong peaks and high intensity. In addition, the peaks broadening manifests the small particle size of the catalyst under study. The existence of $MnO_2$, MgO, $MgAl_2O_4$, $Al_2O_3$, and g-$C_3N_4$ phases may be shown by matching the diffraction patterns with the standard COD cards. The diffractions of the $MgAl_2O_4$ spinel were observed at 2θ values of 19.1, 31.3, 36.8, 44.9, 56.1, 59.5, 65.2, 74.7, and 78.6°. According to the standard COD card No. 9002165, these diffractions respectively originated from (111), (220), (311), (400), (422), (511), (440), (620), and (622) planes. The cubic phase of MgO (COD card, No. 1011117) was observed at 2θ values of 42.9 and 62.3°. These lines are respectively corresponding to (200), and (220) planes. The presence of MgO together with the $MgAl_2O_4$ spinel phase was also previously reported, as reported by Kumar and colleagues in *Sust. Energy Techn. Assess.* 2023, 55, 102905, which is incorporated by reference herein. The diffraction lines observed at 28.3, 40.5, 44.9, 56.0, 66.4, and 79.1° are well-matched with the Pyrolusite phase of $MnO_2$ (COD No. 2105790). The diffractions related to g-$C_3N_4$ were observed at 18.8, 28.2, 35.5, 40.7, 43.1, 44.9, 62.1, and 73.7° (COD No. 9011245). No other phases were detected, indicating the successful fabrication of $MnO_2$/$MgAl_2O_4$/g-$C_3N_4$.

Figure 2A:
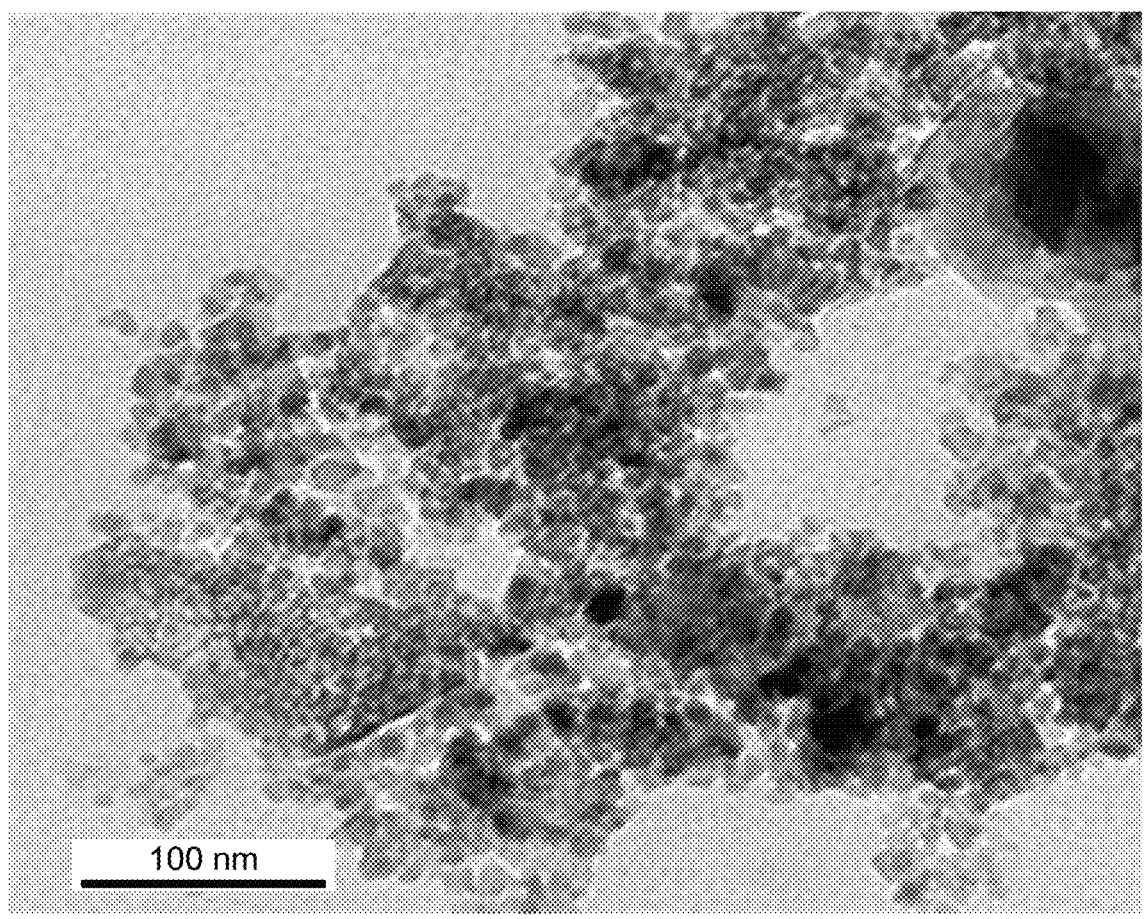
FIG. 2A shows transmission electron microscope (TEM) of an inventive $MnO_2/MgAl_2O_4/g$-$C_3N_4$ nanocomposite.
Figure 2B:
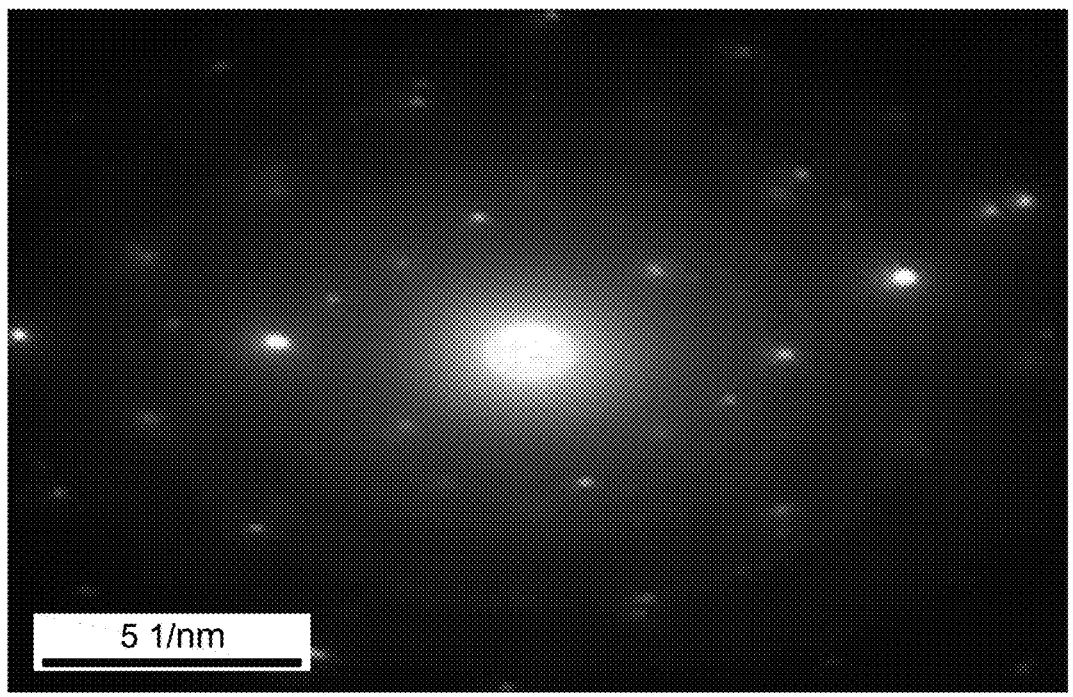
FIG. 2B shows selected area electron diffraction (SAED) of an inventive $MnO_2/MgAl_2O_4/g$-$C_3N_4$ nanocomposite.
Figure 2C:
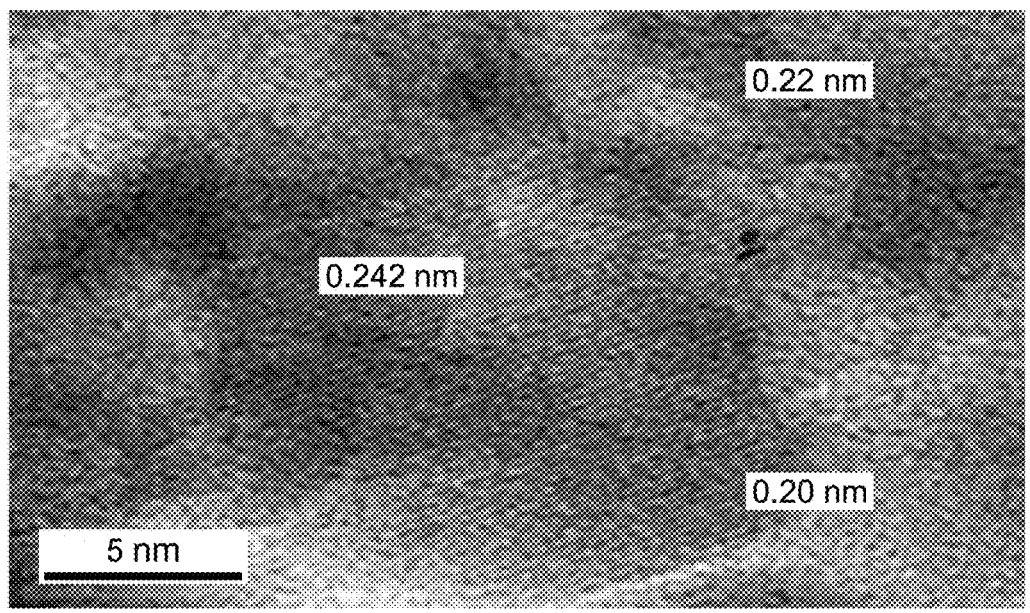
FIG. 2C shows high resolution transmission electron microscope (HRTEM) of an inventive $MnO_2/MgAl_2O_4/g$-$C_3N_4$ nanocomposite.
Figure 2D:
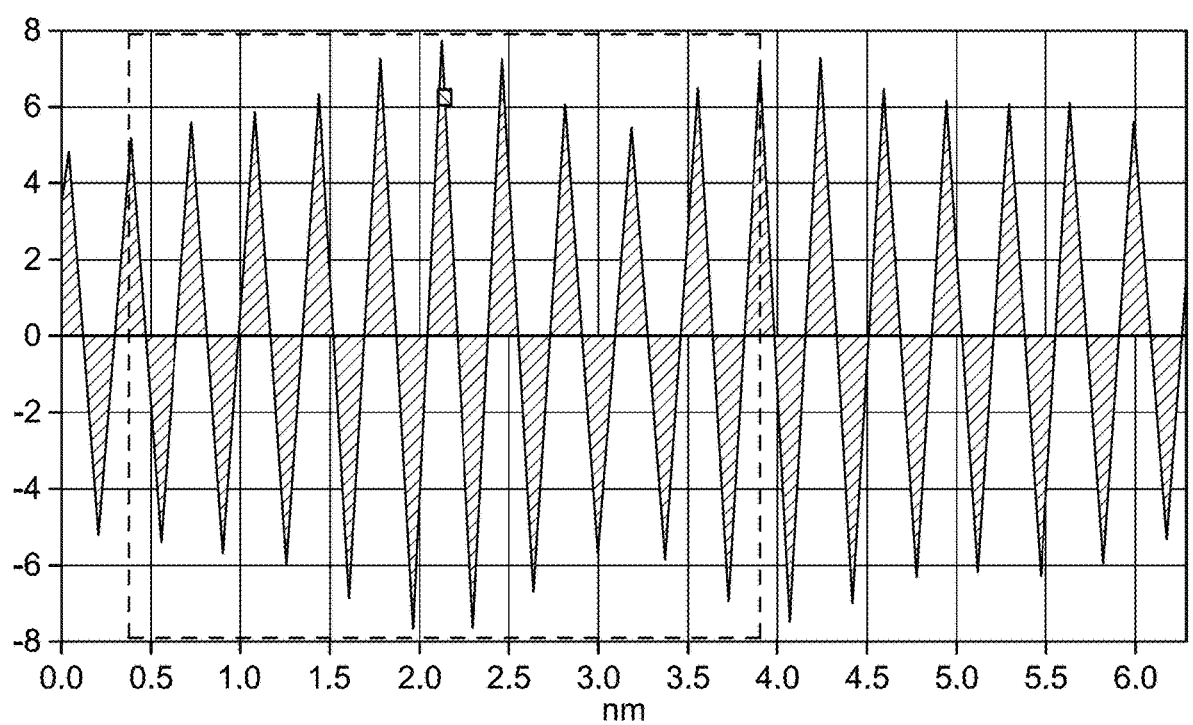
FIG. 2D shows Fast Fourier Transform (FFT) of an inventive $MnO_2/MgAl_2O_4/g$-$C_3N_4$ nanocomposite.
Figure 2E:
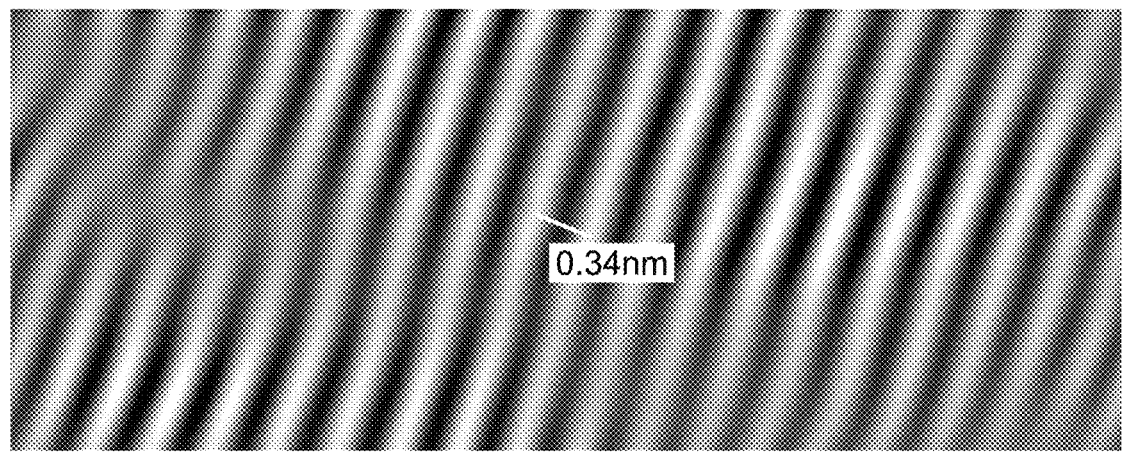
FIG. 2E shows Inverse Fast Fourier Transform (IFFT) patterns of an inventive $MnO_2/MgAl_2O_4/g$-$C_3N_4$ nanocomposite.

TEM images of g-$C_3N_4$@$MnO_2$/$MgAl_2O_4$ nanocomposite were presented in FIG. 2A. The TEM images showed that well dispersion of homogeneous spherical metal oxides nanoparticles with size 7.9 nm on two-dimensional porous structure constructed with curled and wrinkled nanosheets and plantlets of the g-$C_3N_4$ (FIG. 2A). The corresponding SAED pattern reveals diffraction spots with interplanar spacing of 0.298 nm, 0.205 nm, 0.146, 0.133 nm due to (220, spinel), (400, spinel), (002, $MnO_2$) and (211, $Al_2O_3$) diffraction planes (FIG. 2B). The corresponding HRTEM of the composite shows a plane spacing of 0.242 nm and 0.20 nm related to (311), and (400) planes of spinel, and 0.22 nm related to (200) plane of $MnO_2$, characterizing the heterostructure formation (FIG. 2C). The FFT and IFFT measurements show a d value of 0.34 nm given to g-$C_3N_4$@$MnO_2$/$MgAl_2O_4$ nanocomposite, signifying the lattice spacing of (002), indicating the development of spinel structure (FIG. 2D and FIG. 2E).

Figure 3:
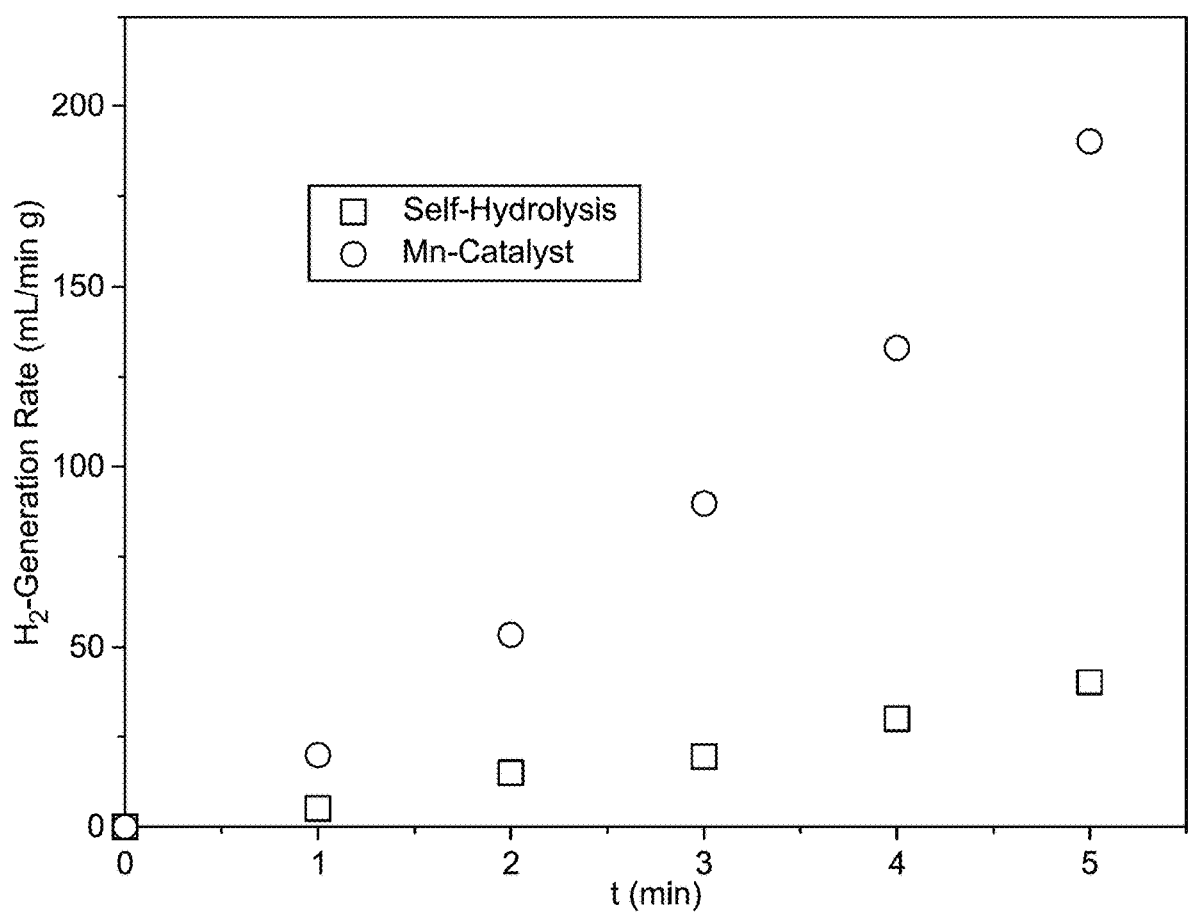
FIG. 3 is a bar graph showing the variation of liberated $H_2$ with reaction time over an inventive g-$C_3N_4$@$MnO_2$/$MgAl_2O_4$ (10:5:85, wt. %) nanocomposite at a reaction temperature of 40° C.

To summarize, the present disclosure is directed to the fabrication of g-$C_3N_4$@$MnO_2$/$MgAl_2O_4$ as a catalyst with a high hydrogen generation rate (HGR) that can hydrolyze sodium borohydride into pure, clean hydrogen ($H_2$) in a matter of minutes. It was made with inexpensive materials and was easily manufactured. A low-weight, stable, and safe hydrogen storage material with a high hydrogen storage capacity of 10.8 weight percent is sodium borohydride ($NaBH_4$). Hydrogen ($H_2$) has become one of the most remarkable energy carriers among renewable sources due to its high energy density (120 MJ/kg), non-toxicity, and environmental friendliness. The catalyst of the present disclosure has a high hydrogen production rate and can hydrolyze sodium borohydride into pure and clean hydrogen in a matter of minutes. FIG. 3 displays the hydrolysis of $NaBH_4$ at a reaction temperature of 40° C. both with and without a catalyst. The prepared demonstrated catalytic activity greater than the self-hydrolysis process, demonstrating the manufactured catalyst's catalytic action, which was plainly visible. The results further show that the catalyst offers an HGR of 2471 mL/(min·g) at a temperature of 40° C.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of hydrogen generation, the method comprising:
contacting sodium borohydride ($NaBH_4$) and water in the presence of a catalyst comprising a nanocomposite comprising graphitic $C_3N_4$, $MnO_2$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2000 to 5000 mL/(min·g).

2. The method of claim 1, wherein the average pore distribution of the nanocomposite is unimodal, and
wherein a BET specific surface area of the nanocomposite is in a range of from 16.2 to 20.2 $m^2$/g, and/or
wherein an average pore diameter of the nanocomposite, according to BJH measurement method, is in a range of from 5 to 15 nm, and/or
wherein an average pore volume of the nanocomposite, according to the BJH measurement method, is in a range of from 0.025 to 0.075 $cm^3$/g.

3. The method of claim 1, wherein the nanocomposite has a (220) spinel interplanar spacing in a range of from 0.258 to 0.338 nm, (400) spinel interplanar spacing in a range of from 0.165 to 0.245 nm, (002) $MnO_2$ interplanar spacing in a range of from 0.106 to 0.186 nm, and (211) $Al_2O_3$ interplanar spacing in a range of from 0.093 to 0.173 nm, according to selected area diffraction.

4. The method of claim 1, wherein the mass relationship of the nanocomposite is in a range of from 9 to 11:4 to 6:84 to 86,
wherein the nanocomposite has a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to selected area diffraction,
wherein an XRD spectrum of the nanocomposite under Cu-filtered CuKα radiation (1.5418 Å) powered at 45 kV and 10 mA has 20 peaks of
an $MnO_2$ pyrolusite phase at 28.4±1, 40.5±1, 44.9±1, 56.0±1, 66.4±1, and 79.1±1°,
an $MgAl_2O_4$ spinel phase at 19.1±1, 31.3±1, 44.8±1, 56.1±1, 59.5±1, 74.09±1, 78.1±1,
an MgO cubic phase at 42.8±1, 62.2±1, and 74.6±1°,
an $Al_2O_3$ phase at 31.3±1, 34.3±1, and 61.6±1°,
g-$C_3N_4$-related diffractions at 18.8±1, 28.2±1, 35.5±1, 40.7±1, 44.6±1, and 73.7±1°, and
wherein no more than 5% relative intensity of any other phase is detected in the XRD spectrum.

5. The method of claim 1, wherein the high hydrogen generation rate in the contacting is in a range of from 2100 to 3500 mL/(min·g), and
wherein the hydrogen generation rate in the contacting is in a range of from 2 to 10-fold that without the nanocomposite.

6. The method of claim 1, wherein the nanocomposite has no more than 0.1 parts, individually, of thiol, amine, carboxylate, and hydroxyl functionalizations per 100 $MnO_2$ units, relative to a total metal oxide weight.

7. The method of claim 1, wherein the nanocomposite comprises no more than 1 wt. %, individually, of $TiO_2$, $Ti_2AlN$, $Fe_3O_4$, AlN, ZnO, and $SiO_2$, relative to a total metal oxide weight.

8. The method of claim 1, wherein the nanocomposite comprises no more than 1 atoms of Ce, relative to 100 atoms of Mn.

9. The method of claim 1, wherein carbon materials in the nanocomposite comprise no more than 1 wt. %, individually, carbon nanotubes or carbon dots, relative to total nanocomposite weight.

10. The method of claim 1, wherein the nanocomposite no more than 1 wt. % AgBr, relative to a total metal oxide weight, and
wherein the nanocomposite no more than 1 wt. % tungsten oxide, relative to a total nanocomposite weight.

11. The method of claim 1, wherein the nanocomposite comprises no more than 1 wt. %, individually, of a sulfide, phosphide, and boride, relative to total nanocomposite weight.

12. The method of claim 1, wherein the nanocomposite comprises no more than 1 wt. %, individually, CuO, aluminosilicate, and $WO_3$, relative to total nanocomposite weight.

13. The method of claim 1, wherein the nanocomposite comprises no more than 1 wt. %, individually, elemental state Co and Fe, relative to total nanocomposite weight.

14. The method of claim 1, wherein the nanocomposite comprises no more than 0.1 wt. % of any noble metal, relative to total nanocomposite weight.

15. The method of claim 1, wherein the nanocomposite comprises no more than 10 wt. % MgO, relative to a total metal oxide weight, and
wherein the nanocomposite comprises no clay.

16. The method of claim 1, wherein the nanocomposite obtained comprises no more than 1 wt. % carbonaceous material besides the graphitic carbon nitride,
wherein the graphitic $C_3N_4$ is not nitrogen deficient, and
wherein carbon materials in the nanocomposite comprise no more than 0.01 wt. % nanotubes and no nanorods, relative to total nanocomposite weight.

17. The method of claim 1, wherein the nanocomposite comprises no more than 10 wt. % $Mn_3O_4$, relative to total manganese oxide weight, or
wherein the nanocomposite comprises manganese oxide in only one oxidation state.

18. The method of claim 1, wherein, relative to a total metal oxide weight, the nanocomposite comprises no more than 1 wt. %, individually, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$ (Co, Ni, Zn)$_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and $LaFeO_3$.

19. The method of claim 1, wherein the graphitic $C_3N_4$ in the nanocomposite consists essentially of sheet morphologies, and/or
wherein the graphitic $C_3N_4$ in the nanocomposite comprises no more than inevitable traces of boron.

20. The method of claim 1, wherein the nanocomposite comprises no more than 10 wt. %, individually, relative to total metal content, of any of Zn, Ce, Gd, La, Ba, Ti, Ca, Sr, Zr, Pb, Ni, Ag, Au, Pt, Pd, Co, Cu, Mn, Cd, W, Ta, Nb, Pr, and Bi, and
wherein the nanocomposite comprises no more than 1 wt. %, individually, relative to total carrier weight, of $SiO_2$, $TiO_2$, ZnO, NiB, and ZnS.

* * * * *